(12) United States Patent
Krueger

(10) Patent No.: US 7,360,846 B2
(45) Date of Patent: Apr. 22, 2008

(54) CERAMIC BALANCE BEADS AND METHOD OF TIRE BALANCING

(76) Inventor: Robert L. Krueger, 75 Chimayo Rd., Rochester, NY (US) 14617

( * ) Notice: Subject to any disclaimer, the term of this patent is extended or adjusted under 35 U.S.C. 154(b) by 205 days.

(21) Appl. No.: 11/157,296

(22) Filed: Jun. 21, 2005

(65) Prior Publication Data

US 2006/0001309 A1 Jan. 5, 2006

Related U.S. Application Data

(60) Provisional application No. 60/582,196, filed on Jun. 22, 2004.

(51) Int. Cl.
*B60B 1/00* (2006.01)

(52) U.S. Cl. .................................................. 301/5.22

(58) Field of Classification Search ............... 301/5.21, 301/5.22
See application file for complete search history.

(56) References Cited

U.S. PATENT DOCUMENTS

| | | | |
|---|---|---|---|
| 2,909,389 | A | 10/1959 | Wilborn |
| 4,179,162 | A | 12/1979 | Zarlengo |
| 6,128,952 | A | 10/2000 | LeBlanc |
| 6,129,797 | A * | 10/2000 | Heffernan et al. ............ 156/75 |
| 6,249,971 | B1 | 6/2001 | Fogal, Sr. |
| 6,322,889 | B1 * | 11/2001 | Lara-Curzio et al. ....... 428/378 |
| 7,168,142 | B2 * | 1/2007 | Nowaczyk .................. 29/90.7 |

* cited by examiner

*Primary Examiner*—Jason R. Bellinger
(74) *Attorney, Agent, or Firm*—Hiscock & Barclay, LLP

(57) ABSTRACT

A container 10 is filled with ceramic balancing beads 20. The container is held closed by a removable clip 15, 16 or a mild adhesive 14. The beads are high density and therefore low in volume with regular surfaces, spherical or ellipsoid, for moving smoothly over one another. The container 20 self-opens when impact forces overcome the mild adhesive.

29 Claims, 3 Drawing Sheets

CERAMIC BALANCE BEADS AND METHOD OF TIRE BALANCING

CROSS-REFERENCE TO RELATED APPLICATIONS

This patent application claims the benefit of the filing date of provisional U.S. patent application Ser. No. 60/582,196 filed on Jun. 22, 2004.

BACKGROUND

It is important to balance tire on vehicles and the importance of balancing tire weight increases with the size or the vehicle and the size of its tires. Even though tires may appear identical, variations in their manufacture invariably produce tires whose weight is unevenly distributed around the circumference of the tire. Unless this unequal tire weight is counterbalanced, tires vibrate during operation and the vibrations will sharply reduce tire performance and longevity.

A conventional method for balancing tires uses wheel weights fixed to rims of the wheels that support tires. Common lead/lead/alloy wheel weights are bonded to a piece of steel for rigidity and for installation mounting purposes. When this steel portion comes in contact with modern aluminum alloy wheels, the softer aluminum alloy is scratched and abraded, and eventually will result in corrosion due to the interaction of two dissimilar metals. If the alloy rim has had a factory protective coating installed, the installation of the wheel weight will remove this coating, allowing road salt to corrode the metal and other contaminants to seep under the coating.

These wheel weights are unsightly on modem, expensive, alloy rims. Moreover, wheel weights are only effective until the imbalance point changes. Imbalance points change over time due to normal wear, panic stops, or accelerated, uneven wear due to load and road condition variations. Any of these conditions can, and normally do, cause the imbalance position to change. This is why most tire manufacturers recommend rebalancing the tires two to three times throughout the life of the tire. In the real world, however, most people only have their tires balanced once at the time of installation. As a result, most vehicle owners experience less tire mileage than they could actually obtain if they had a system to maintain the balance in their tires.

Wheel weights can fall off, or be knocked off if a person runs into a curb. It is not uncommon for small clumps of dirt, debris, or snow to get caught on the inside rim of the tire. The original tire using weights was balanced without this additional weight, and so is now out of balance. As long as the additional weight does not exceed the capacity of the amount of beads in the tire, the beads will shift their position to try to correct for the new imbalance. Standard wheel weights cannot do this without being removed, and the entire assembly rebalanced.

Others have addressed the drawbacks inherent in wheel weights by providing tire balancing material inside a tire. For example, an early attempt at a self-balancing fire is found in U.S. Pat. No. 2,909,389. That patent describes how weights are placed in a tube contained in a tire. When the wheel rotates the weights are thrown against the inner surface of the outer wall of the tube and the imbalance of the wheel is said to be corrected by the position assumed by the weights. Later patents describe self-balancing powders, glass beads or steel beads. See, for example, U.S. Pat. No. 6,249,971 (polymer) and U.S. Pat. No. 6,128,952 (glass) and U.S. Pat. No. 4,179,162 (steel, ceramic, or rubber cylinders).

SUMMARY

The invention provides a method and apparatus for treating a tire to balance a wheel, especially a wheel of a large vehicle such a wheel on a tractor trailer or a recreational vehicle. The method uses a self-opening container. The self-opening container may be of any suitable material such as plastic, polyethylene, cellulose, or other flexible material. Sheets of the material are cut in to squares or rectangles that are joined together on three sides. The open sides receive solid ceramic non-porous, high density, regularly shaped, smooth balance beads. In a preferred embodiment, the ceramic material comprises zirconium silica beads which are two thirds zirconia ($ZrO_2$) and one third silicate ($SiO_2$). A clip holds the bag closed until ready to install. Then the clip is removed and a mild adhesive is applied to the open end of the bag to keep the bag closed long enough to mount the tire on a wheel. The bag with the ceramic beads is then placed in a tire and the tire is installed on a wheel. Upon impact, the mild adhesive yields and the beads spill out of the bag.

In a preferred embodiment the ceramic balancing material has a density of at least 3.0 and may range from 3.0 to 6.1 or higher gm/cc. The material also has a hardness of about 7 Mhos and may be in a range of 6 to 9 Mhos. The balancing material has a size in a range between 0.6 to 2.0 mm across the diameter (if a sphere) or across the major axis (if and ellipsoid). In a preferred embodiment, the size of the beads ranges from 0.8 to 1.0 mm. The balancing material is a ceramic material comprising $ZrO_2$ and $SiO_2$, where the ratio of $ZrO_2$ to $SiO_2$ is 2 to 1 or greater.

DRAWING

DETAILED DESCRIPTION

Balancing Beads

Figure 1:
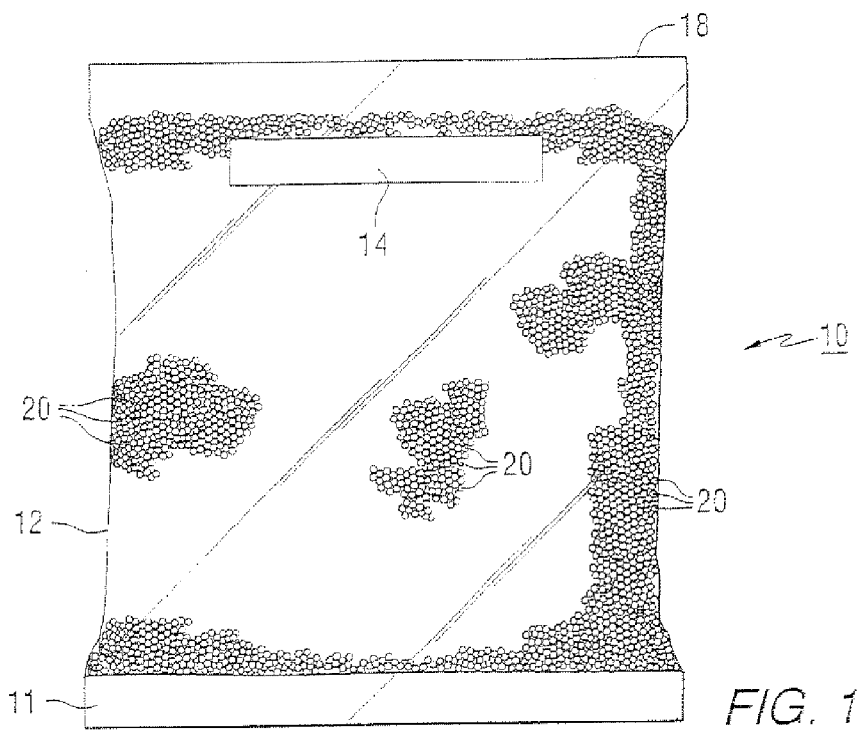
FIG. 1 is a view of a container filled with ceramic balancing beads.
Figure 2:
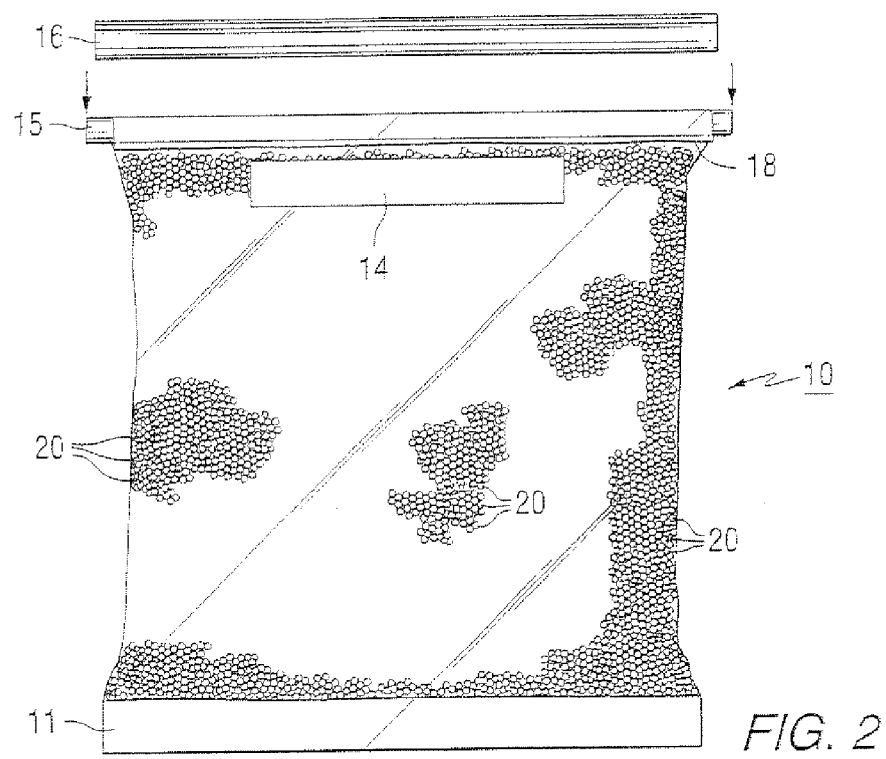
FIG. 2 is a view showing a clip engaging the container.
Figure 3:
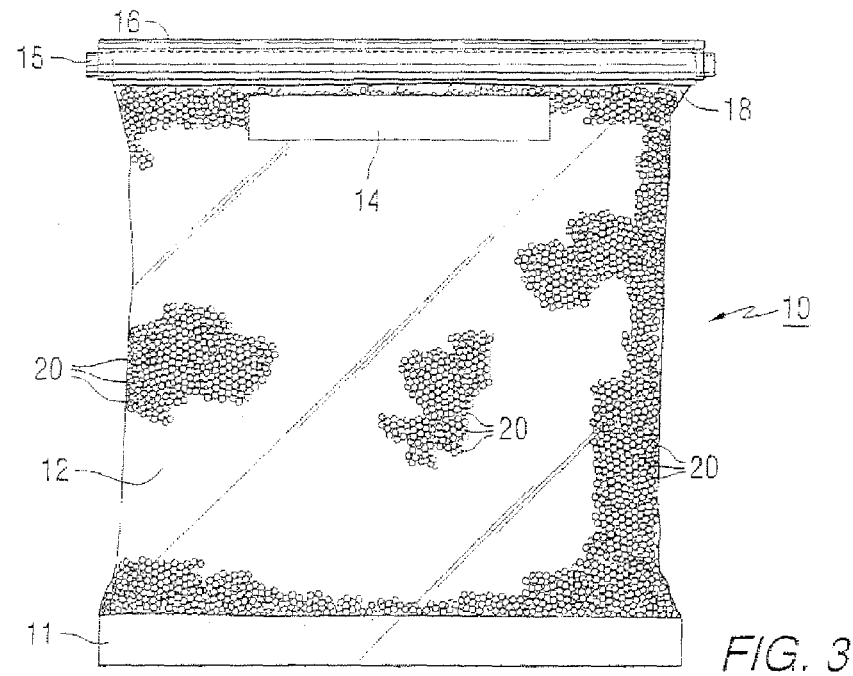
FIG. 3 is shows the clip engaged with the container.

The term "ceramics" as used herein are materials that are typically crystalline and are compounds formed between metallic and non-metallic elements such as aluminum and oxygen (alumina-$Al_2O_3$), silicon and nitrogen (silicon nitride-$Si_3N_4$) and silicon and carbon (silicon carbide-SiC). Glass is often considered a subset of ceramics. Glass is somewhat different than ceramics in that it is amorphous, or has no long range crystalline order.

The balancing beads of the invention are preferably a solid ceramic material. In its broader aspects the invention includes metal oxide ceramics, particularly refractory metal oxide ceramics, such as, zirconia silica, and equivalents thereof. For example, zirconia silica fused ceramic beads comprise approximately two thirds of $ZrO_2$ and one third of $SiO_2$, by weight. The balancing beads of the invention have one or more desired properties. The inorganic ceramic material is formed in the shape of a smooth, regular, preferably round ball. The round, regular shape enables the beads to move easily over one another and over the inside surface of the tire. The smooth surface of the beads enhances their movement over each other and over the inside surface of the tire. The round, regular shape also prevents the beads from abrading the inside surface of the tire, and thus is an improvement over irregularly shaped balancing materials or cylindrically shaped balance elements that abrade one another and possibly the inside walls of the tire.

In one embodiment the solid ceramic beads are between about 0.6 and 2.0 mm in diameter. The beads have a density between about 3.0 and 6.1 grams per cubic centimeter or higher and a hardness of between 6-9 Mhos and preferably about 7 Mhos. In contrast, glass has a density of 2.6 gm/cc.

The ceramic beads are hydrophobic (water-repelling) and thus will not rust, oxidize or corrode. The beads are installed in oversize tires that typically hold a large volume of air with normal humidity. When temperature drops, especially in higher latitudes, much of the humidity will condense and collect on anything in the tire. Irregularly-shaped balancing media can quickly agglomerate, clump or stick together due to surface tension between the many small granules and the moisture released from the air in the tire. In contrast, the beads of the invention, due to their comparatively large size, perfectly round shape, and lubricious, smooth ceramic and non-porous surface, are extremely resistant to any "clumping" action.

The size, shape and surface texture of the balancing material are important. Some prior art material is provided in briquette form. The prior art balancing briquette is placed in a tire where it undergoes impact forces that break the briquette down into smaller pieces. See, for example, U.S. Pat. No. 6,249,971 whose entire disclosure is herein incorporated by reference. However, the briquette material may break down into non-uniform smaller particles. Even when the briquette breaks down into powder, the powder is subject to the clumping problem identified above. In contrast, the solid, regularly shaped and uniform size non-porous ceramic beads of the invention overcome the surface tension and clumping problems typically experienced by uncontrolled balancing powders provided by broken briquettes and other irregular pulverent materials.

The ceramic beads of the invention are 60% heavier than glass beads. As used herein the term "glass" means a homogeneous material with a random, liquid like (non-crystalline) molecular structure. It is made by a manufacturing process that requires that the raw materials be heated to a temperature sufficient to produce a completely fused melt, which, when cooled rapidly, becomes rigid without crystallizing.

When compared to glass beads, solid ceramic beads occupy less volume than glass beads and are thus more efficient, especially in smaller tires. See, for example, U.S. Pat. No. 6,128,952 whose entire disclosure is hereby incorporated by reference. That patent describes how glass beads are inserted into a tire. However, glass is less dense than ceramic and too large a volume of glass or steel beads can cause interference between the glass beads themselves and inhibit their free-rolling action. The heavier and denser ceramic beads of the invention are more efficient. In a smaller volume than glass beads, ceramic beads of equal weight provide the same balancing effect as the larger amounts of glass or steel beads.

The solid ceramic beads of the invention have an advantage over steel beads. Although some steel beads are initially coated with a protectant, such as polytetrafluoroethylene (PTFE). However, that protective coating is rapidly removed from the steel beads by transferring the protectant to the softer inner liner of the tire as they roll around on this liner, much the same way that a paint roller transfers paint to a wall. Eventually, this process removes most of the protective coating. With normal moisture that is present in the tire air, the now-unprotected steel beads will rust quickly. If the vehicle is not moved for two or three days, the rusted beads may rust together in a mass and they will become partially or totally ineffective. The solid ceramic beads of the invention do not rust, as their surface is not affected by moisture.

In a preferred embodiment, the material the $ZrO_2$ and $SiO_2$ are fused meaning that they are heated to their melting temperatures and allowed to solidify. This fused ceramic is known as zirconium silica and is consistent from crust to core. Another related material is zirconium silicate. It has the same components but is sintered. It has a hard outer crust and a softer inner core. Its density is 4.0 gm/cc.

Alternative materials are available. For example, high density zirconia silica is fused zirconium silica containing a higher amount of zirconia than the more common formulation. Its density is 4.6 gm/cc. Another material is toughened zirconia silica which is fused zirconia silica toughened with yttria and alumina. This bead is excellent as a medium density media with longer wear and durability than the standard zirconia silicas. It can be made in small diameter and has a density of 4.6 gm/cc. Magnesium stabilized zirconia oxide is another balancing bead material. It has a density of about 5.5 gm/cc. Another potential substitute is cerium stabilized zirconia oxide. It has a density of between 6.0 and 6.25 g/cc. A final substitute is yttria stabilized zirconia oxide. It is non-porous and has a density of 6.0 gm/cc.

Self Opening Container

The invention packages its solid ceramic beads in a self-opening container. The self-opening container is a made of any suitable flexible packaging material such as plastic, polyethylene, paper, cellulose, etc. Turning to FIGS. 1-4, a container 10 is shaped in a square or rectangular shape, but any shape is possible. The container comprises two opposite sheets 12, 13 joined together along their edges and at one end to leave an opening at the other end. A gusset 11 provides added strength on the closed end of the container 10. A quantity of solid, ceramic balancing beads 20 is held in the container 20.

Figure 4:
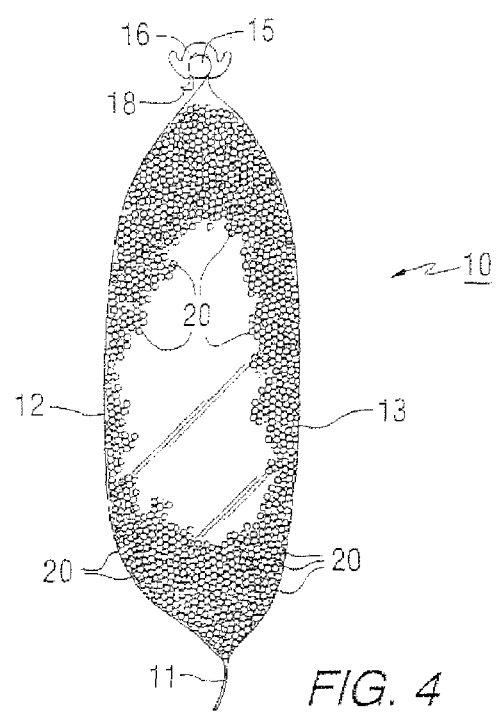
FIG. 4 is a side view of the container shown in FIG. 3.
Figure 6:
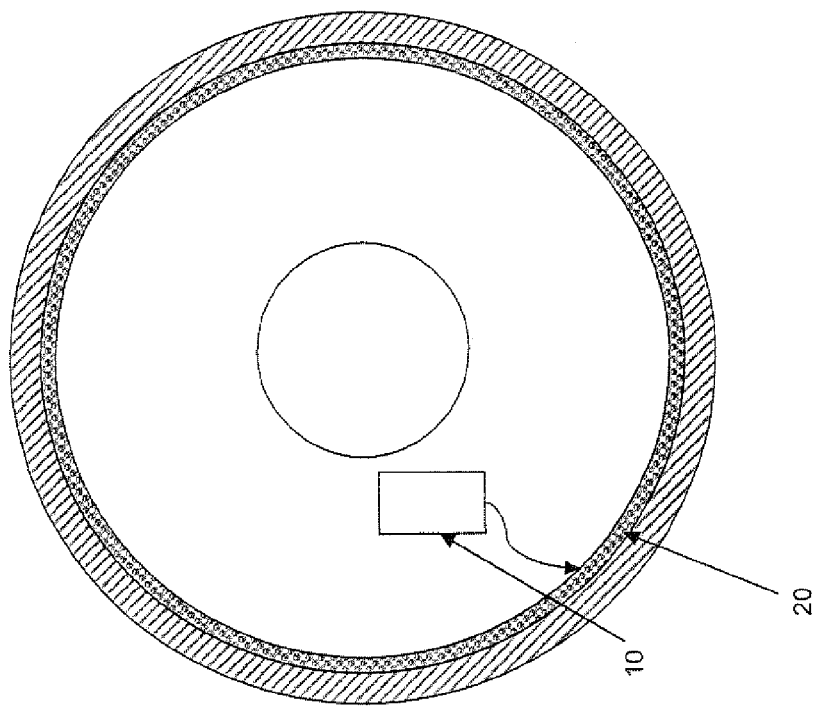
FIG. 6 is a cross-sectional view of the tire and container of FIG. 3 moving and showing release of the beads into the tire.
Figure 5:
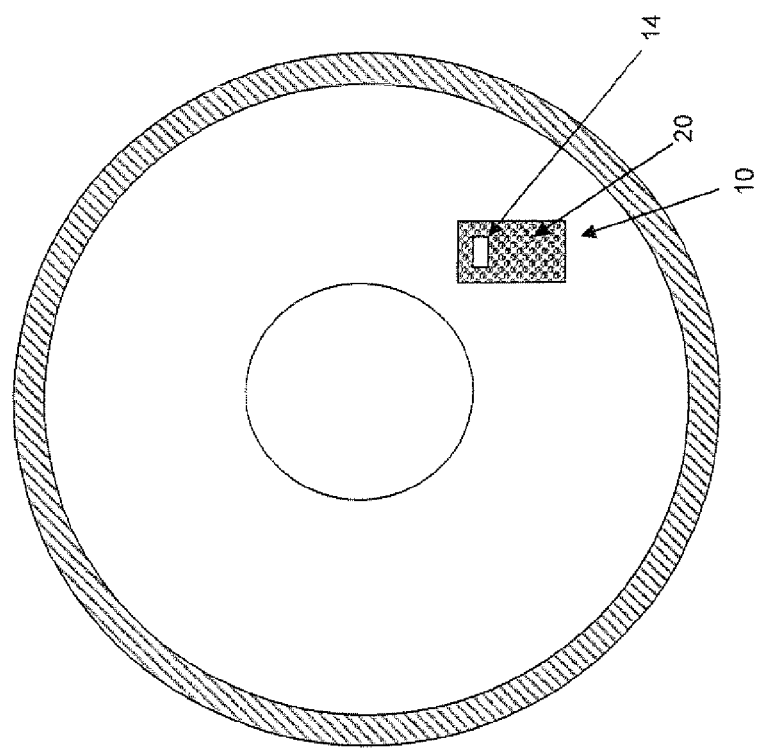
FIG. 5 is a cross-sectional view of a tire showing the container of FIG. 3 inserted on the sidewall of the tire.

A mild adhesive 14 is applied to the inside surface of one of the sheets 12 proximate the open end 18 of the container. Protective removable strips (not shown) cover the mild adhesive 14 while the bag is filled. The upper, open end 18 of the bag is secured closed by a clip that includes a rod 15 and resilient wing cover 16. The clip is installed between the location of the mild adhesive strip and the closed end of the bag so that the mild adhesive strip will extend beyond the clip. The upper ends of sheets 12, 13 and 18 of the container are wrapped over the rod 15 and the cover 16 is press fit onto the rod so that the end 18 of the container is secured between the rod 15 and the wing cover 16 as shown in FIG. 4. The clip 15, 16 securely holds the container closed until the beads are ready for installation in a tire. The protective strips are removed and the ends of the sheets are pressed together at the location of the exposed mild adhesive.

The self-opening bags are placed in a tire while the tire is off its wheel. The user removes the clip 15, 16 from the top 18 of the container 10. If the protective strip has not already been removed, the user removes the protective strips from above the mild adhesive 14. Then the user presses the sheets 12, 13 together at the mild adhesive 14 to hold the container end 18 closed. The container 10 is placed in a tire and the tire is installed on the wheel. The light adhesive 14 is sufficiently strong enough to hold the container 10 closed during installation but weak enough to allow the container 10 to open upon application of an impact to the tire. The container 10 is opened by simply bouncing the tire on the ground or by installing the tire on a vehicle and allowing impact forces that are generated during driving to open the container.

Those skilled in the art understand that other clip structures may be used to hold the bags firmly closed until ready for use. The bags could even be sealed at both ends and the user could cut open the bag at the end with the mild adhesive strip.

Ceramic beads, such as zirconium silica beads of between about 0.6 to 2.0 mm in diameter are inserted into a vehicle (car or truck) tire primarily through the self-opening container 10 described above or the via the valve stem utilizing a special application tool. As the vehicle speed increases the angular velocity of the tire increases proportionately. Any imbalance in the tire will begin to move the tire in a vertical, oscillating motion. When this begins to happen, the ceramic beads quickly move to a point opposite that of the imbalance point until such time that all oscillations cease and the tire/wheel assembly are balanced. Any excess ceramic beads that are not required to correct the imbalance distribute themselves evenly around the inside circumference of the tire.

The ceramic bead substance is substantially inert and will not chemically react with any rubber substance, steel, or alloy used to manufacture wheels for vehicle tires. It is not affected, nor is its action impeded, by moist air normally found in vehicle tires and compressed air used to fill these tires.

The beads are installed by weight. The larger the tire, generally the more beads needed to balance a wheel. For passenger cars, approximately two to six ounces per wheel are needed, depending upon the size of the tire. Commercial and large trucks may require from three to as much as twenty ounces per wheel, depending upon the size of the wheel.

The inventive process and apparatus is superior to prior art techniques. For example, U.S. Pat. No. 6,249,971 describes a pulverent material that is held in a bag that shreds or is otherwise destroyed during operation. One potential problem with such a system is that the bag is not entirely destroyed and at least portions of the bag may remain intact. For example, if a corner of the bag survives, the pulverent material may remain trapped in the surviving corner and thus form a large clump of material that will itself unbalance the wheel. In contrast, the invention does not rely upon the unpredictable actions of shredding or destroying a bag but rather upon the more predictable release of a light adhesive to open of bag. Thus, the invention improves upon the prior art apparatus and method for balancing wheels.

As an alternative method of installation, the ceramic beads are inserted into a tire through the valve stem using a special application tool for filling tires on wheels with pulverent material. In a preferred installation, the tire is equipped with a filtered valve core. The filter prevents the beads from blocking the valve element. Filtered valve cores and tools for installing balancing material suitable for use with ceramic beads are provided by International Marketing Inc. Filters are needed when the beads are larger than the valve seat. Without a filter, the beads may stick on the valve seat and prevent it from closing and the tire will not hold a charge of air. Of course, if the ceramic beads are smaller than the valve seat, there is little or no risk of the valve sticking in an open position and filtered valve cores are not needed. In this embodiment, the beads must be small enough to pass through the valve stem. At present, most valve stems will accept beads of 1.25 mm or smaller. Of course larger beads may be installed but not through the valve stem. One could use the self-opening bags, a funnel, or other means to insert the beads into the tire.

The inventive method and apparatus has advantages over the prior art methods and apparatus. The high-density ceramic balancing beads extend the life of most tires by reducing or eliminating premature wear. The tires continuously self-balance themselves and the balance material is durable and efficient. In addition, the user no longer has the inherent problem of wheel weights that may fall off of be knocked off. Without such wheel weights, there is no wheel weight damage due to either mechanical abrasion of the wheel surface, or bimetallic corrosion of expensive alloy wheels. Periodic rebalancing is not required and the invention thus saves the user the service fees charged to periodically rebalance tires that use wheel weights. Continuously self-balanced tires wear better and the user is more likely to have a longer period between tire replacements.

The invention claimed is:

1. A method for treating a tire to balance a wheel comprising the steps of:
   providing a container with an opening at one end and holding a quantity of balancing material;
   wherein the container has a removable resilient clip on the container at a location on the container spaced axially between the open end of the container and an adhesive, and at least as far from the open end as the adhesive;
   temporarily closing the ends of the container;
   inserting the temporarily closed container into a tire;
   mounting the tire on a wheel; and
   impacting the wheel to open the container and thereby release the balancing material into the inside of the tire.

2. The method of claim 1 wherein the balancing material comprises zirconium silica beads.

3. The method of claim 1 comprising the further step of mounting the wheel on an axle of a vehicle.

4. The method of claim 3 wherein the step of impacting the wheel to open the container comprises operating the vehicle.

5. The method of claim 1 wherein the step of impacting the wheel to open the container comprises bouncing the wheel.

6. The method of claim 1 wherein the container comprises a rectangular bag.

7. The method of claim 1 wherein the balancing material has a density greater than 2.6 gm/cc.

8. The method of claim 1 wherein the balancing material has a density of between 3.0 and 6.1 gm/cc.

9. The method of claim 1 wherein the balancing material has a hardness of about 7 Mohs.

10. The method of claim 1 wherein the balancing material has hardness in a range of 6 to 9 Mohs.

11. The method of claim 1 wherein the balancing material has a size between 0.6 and 2.0 mm.

12. The method of claim 1 wherein the balancing material comprises $ZrO_2$ and $SiO_2$.

13. The method of claim 12 wherein the ratio of $ZrO_2$ to $SiO_2$ is 2 to 1 or greater.

14. The method of claim 12 wherein the balancing material is fused.

15. The method of claim 12 wherein the balancing material is sintered.

16. The method of claim 1 wherein the balancing material comprises one or more of the materials from the groups consisting of fused zirconia silica toughened with yttria and alumina, magnesium stabilized zirconia oxide, cerium stabilized zirconia oxide, and yttria stabilized zirconia oxide.

17. An apparatus for treating a tire to balance a wheel comprising:
 a container with an opening at one end for holding a quantity of balancing material;
 a quantity of ceramic balancing material in the container;
 an adhesive applied to the opening to keep the container temporarily closed; and
 a removable resilient clip on the container at a location on the container spaced axially between the open end of the container and the adhesive and, at least as far from the open end as the adhesive.

18. The apparatus of claim 17 wherein the balancing material comprises zirconium silica beads.

19. The apparatus of claim 17 wherein the container comprises a rectangular bag.

20. The apparatus of claim 17 wherein the balancing material has a density of more than 2.6 gm/cc.

21. The apparatus of claim 17 wherein the balancing material has a density of between 3.0 and 6.1 gm/cc.

22. The apparatus of claim 17 wherein the balancing material has a hardness of about 7 Mohs.

23. The apparatus of claim 17 wherein the balancing material has a hardness in a range of 6-9 Mohs.

24. The apparatus of claim 17 wherein the balancing material has a size between about 0.6 to 2.0 mm.

25. The apparatus of claim 17 wherein the balancing material comprises $ZrO_2$ and $SiO_2$.

26. The apparatus of claim 25 wherein the ratio of $ZrO_2$ to $SiO_2$ is 2 to 1 or greater.

27. The apparatus of claim 25 wherein the balancing material is fused.

28. The apparatus of claim 25 wherein the balancing material is sintered.

29. The apparatus of claim 17 wherein the balancing material comprises one or more of the materials from the groups consisting of fused zirconia silica toughened with yttria and alumina, magnesium stabilized zirconia oxide, cerium stabilized zirconia oxide, and yttria stabilized zirconia oxide.

* * * * *